Figure 1:
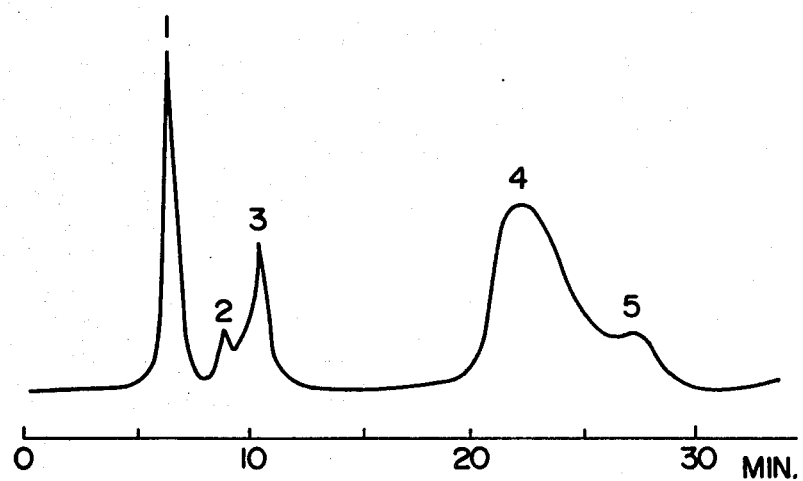
Figure 2:
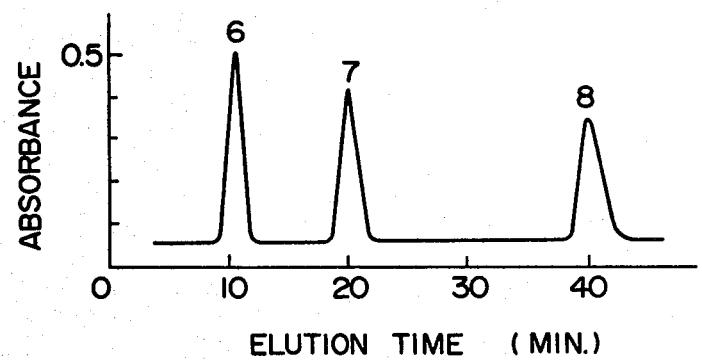

United States Patent [19]

Kamiyama et al.

[11] Patent Number: 4,468,330
[45] Date of Patent: Aug. 28, 1984

[54] FILLER FOR LIQUID CHROMATOGRAPHY USEFUL FOR SEPARATING A HEMOGLOBIN VARIANT IN BLOOD

[75] Inventors: Fumio Kamiyama; Minoru Kohara, both of Kyoto; Mituo Nagata, Shiga; Yasuhiko Araki, Amagasaki, all of Japan

[73] Assignee: Sekisui Kagaku Kogyo Kabushiki Kaisha, Osaka, Japan

[21] Appl. No.: 371,491

[22] Filed: Apr. 23, 1982

[30] Foreign Application Priority Data

Apr. 27, 1981 [JP] Japan .................................. 56-64812
Jun. 25, 1981 [JP] Japan .................................. 56-99451

[51] Int. Cl.[3] ...................... B01D 15/08; C08F 220/20
[52] U.S. Cl. ......................................... 210/656; 521/38
[58] Field of Search ........................... 521/38; 210/656

[56] References Cited

U.S. PATENT DOCUMENTS

| | | |
|---|---|---|
| 3,957,741 | 5/1976 | Rembaum et al. ................. 210/656 |
| 4,036,788 | 7/1977 | Steckler ............................... 521/38 |
| 4,128,706 | 12/1978 | Seita et al. ......................... 210/656 |
| 4,202,775 | 5/1980 | Abe et al. ............................. 521/38 |
| 4,243,534 | 1/1981 | Bulbenko ............................ 210/656 |

FOREIGN PATENT DOCUMENTS

| | | | |
|---|---|---|---|
| 0400124 | 11/1981 | European Pat. Off. .............. 521/38 |
| 2503774 | 8/1975 | Fed. Rep. of Germany ........ 521/38 |
| 2728146 | 12/1977 | Fed. Rep. of Germany ........ 521/38 |

*Primary Examiner*—Joseph L. Schofer
*Assistant Examiner*—Peter F. Kulkosky
*Attorney, Agent, or Firm*—Wenderoth, Lind & Ponack

[57] ABSTRACT

A filler for liquid chromatography, said filler consisting essentially of a hydrophilic ion-exchanger obtained by copolymerizing a mixture of (A) 5 to 90% by weight of a polymerizable monomer containing one polymerizable double bond and at least one carboxyl group per molecule and having a hydrophobic parameter of not more than 2.3, (B) 10 to 95% by weight of a crosslinkable polymerizable monomer containing at least two polymerizable double bonds per molecule and having a hydrophobic parameter of not more than 2.3, and (C) 0 to 85% by weight of a monomer being different from the monomer (A), containing one polymerizable double bond per molecule and having a hydrophobic parameter of not more than 2.3; and a method for separating a biological material such as proteins, enzymes and amino acids by liquid chromatography using the aforesaid filler.

3 Claims, 5 Drawing Figures

FILLER FOR LIQUID CHROMATOGRAPHY USEFUL FOR SEPARATING A HEMOGLOBIN VARIANT IN BLOOD

This invention relates to a filler for liquid chromatography, of which the separating mechanism is based on its ion exchanging activity.

It has been known to use an ion-exchange resin obtained by the copolymerization of methacrylic acid and divinylbenzene as a filler for liquid chromatography. If this filler is used in liquid chromatographic separation of a biological material such as proteins, enzymes and amino acids, its components may remain adsorbed to the hydrophobic divinylbenzene portion of the filler. This creates the problem that long periods of time are required for analyzing the material, or the analysis fails because of the inability of the desired components to be eluted from the filler. If the amount of divinylbenzene to be copolymerized is decreased in an attempt to solve the above problem, the resulting copolymer does not have a sufficient strength for use as a filler for liquid chromatography.

It is an object of this invention therefore to provide a filler suitable for separating a biological material such as proteins, enzymes and amino acids by ion-exchange liquid chromatography.

The filler of the invention can be effectively used for assaying hemoglobin in the blood, particularly hemoglobin variants, for diagnostic or other purposes.

Human adult hemoglobin (to be abbreviated Hb) is a protein having a molecular weight of about 68,000 which exists in such a form that four hemes are bonded to one globin protein. When normal human Hb is electrophoresed at a pH of 8.6, not only does Hb, or $HbA_o$, constitute 90 to 95% of the entire Hb sample separated, but also HbF and $HbA_1c$ having a slightly lower rate of mobility than $HbA_o$ are separated afterwards, and subsequently $HbA_1a$ and $HbA_1b$ are separated. Thus, the presence of these hemoglobin variants is determined. The presence of $HbA_1d$ and $HbA_1e$ have also been ascertained from a more elaborate electrophoretic test. These hemoglobin variants differ in primary structure from normal hemoglobin ($HbA_o$), or result from the combining of a sugar with $HbA_o$. It has been found that the separation and determination of these hemoglobin variants is important as a measure of a diseased condition. For example, assay of HbF is essential for diagnosing hereditary hyper-HbF, and checking of an increase or decrease in $HbA_1c$ is essential for the treatment of diabetes. A component called $HbA_2$, like HbF, is hereditary, and it has been found that a hemoglobin variant called acetylated hemoglobin (Ac, Hb) is formed as a result of administering a drug containing an acetyl group, such as aspirin. From a medical viewpoint, therefore, it has become increasingly important to assay these hemoglobin variants.

Up to date, however, no method has been proposed which can separate and determine these hemoglobin variants within short periods of time with a high accuracy.

According to this invention, there is provided a filler for liquid chromatography, said filler consisting essentially of a hydrophilic ion-exchanger obtained by copolymerizing a mixture of (A) 5 to 90% by weight of a polymerizable monomer containing one polymerizable double bond and at least one carboxyl group per molecule and having a hydrophobic parameter of not more than 2.3, (B) 10 to 95% by weight of a crosslinkable polymerizable monomer containing at least two polymerizable double bonds per molecule and having a hydrophobic parameter of not more than 2.3, and (C) 0 to 85% by weight of a monomer being different from the monomer (A), containing one polymerizable double bond per molecule and having a hydrophobic parameter of not more than 2.3.

The present invention also provides a method for separating a biological material such as proteins, enzymes and amino acids, especially hemoglobin variants, by liquid chromatography using the aforesaid filler.

The polymerizable monomer (A) used in this invention contains one polymerizable double bond and at least one carboxyl group per molecule and has a hydrophobic parameter of not more than 2.3, preferably not more than 0. It is present in a proportion of 5 to 95% by weight in the monomeric mixture.

The "hydrophobic parameter" of a given compound, as used herein, denotes the logarithm of the ratio of the solubility of that compound in octyl alcohol to that in water, and is inherent to that compound. The hydrophobic parameter can be determined experimentally. But since the contributions of the individual fragments in a molecule (the hydrophobic fragmental constants) can be obtained by calculation, the hydrophobic parameter value can be calculated as the sum total of these.

The method of calculating hydrophobic parameters is described in Chapter 3 of R. F. Rekker, "The Hydrophobic Fragmental Constant" (Elsevier Scientific Publishing Co., 1977), and the hydrophobic parameter values given in the present application are based on this calculating method.

The copolymer used in this invention is an ion exchanger ion-exchanging activity because of the presence of units derived from the carboxyl-containing polymerizable monomer (A). If the proportion of the monofunctional monomer (A) containing a carboxyl group is too small, the ion-exchange ability of the resulting copolymer is reduced. Hence, the monomer (A) should be present in a proportion of at least 5% by weight in the monomeric mixture.

The crosslinkable and polymerizable monomer (B) used in this invention contains at least two polymerizable double bonds per molecule, and has a hydrophobic parameter of not more than 2.3, preferably not more than 0. It is present in a proportion of 10 to 95% by weight in the monomeric mixture.

If the proportion of the monomer (B) is too small, the density of crosslinkages in the resulting copolymer decreases, and its mechanical strength is not high enough to withstand high pressures when it is used as a filler for high-performance liquid chromatography. Accordingly, the proportion of the monomer (B) should be at least 10% by weight.

The monomeric mixture used in this invention may contain up to 85% by weight of the monomer (C) being different from the monomer (A), containing one polymerizable double bond per molecule and having a hydrophobic parameter of not more than 2.3, preferably not more than 0, so that the proportions of the monomers (A) and (B) are not below the lower limits specified above.

All of the monomers included in the monomeric mixture from which a copolymer usable as the filler of this invention is produced should have a hydrophobic parameter of not more than 2.3. This is based on our finding that fillers composed of an ion exchanger obtained by copolymerization of monomers having a hydrophobic parameter of not more than 2.3 exhibit an excellent separabiting ability in the analysis of hydrophilic substances or biological substances such as proteins, enzymes and amino acids. It has been found in accordance with this invention that, for example, divinylbenzene customarily used as a cross-linkable and polymerizable monomer for the production of ion exchangers has a hydrophobic parameter of as high as 3.8, and the use of an ion exchanger containing units derived from divinylbenzene as a filler cannot produce the effects attained by this invention. In order to prevent the undesirable adsorption of hydrophilic materials to the filler of this invention during their analysis, it is preferred that all of the monomers (A), (B) and (C) used in this invention have a hydrophobic parameters of not more than 0.

Examples of polymerizable monomers (A) suitably used in this invention include acrylic acid (hydrophobic parameter $-2.3$; the parenthesized figures appearing hereinbelow show hydrophobic parameters), methacrylic acid ($-1.9$), crotonic acid ($-1.9$), and maleic acid ($-5.7$). They may be used as a mixture of two or more.

Examples of suitable crosslinkable and polymerizable monomer (B) used in this invention include tetramethylolmethane di-, tri- and tetra-acrylates ormethacrylates, such as tetra-methylolmethane triacrylate ($-0.73$), tetramethylolmethane tri-methacrylate (0.59), tetramethylolmethane diacrylate ($-1.70$), tetramethylolmethane dimethacrylate (0.82), tetramethylolmethane tetraacrylate (0.24) and tetramethylolmethane tetramethacrylate (0.20); trimethylolethane triacrylate (0.88) and trimethylolethane trimethacrylate (2.20); and dipentaerythritol hexaacrylate or hexamethacrylate, such ad dipentaerythritol hexaacrylate ($-0.09$). There can also be used polyalkylene glycol diacrylates or dimethacrylates, such as polyethylene glycol diacrylates or dimethacrylates (e.g., tetraethylene glycol dimethacrylate ($-0.30$)), and polypropylene glycol diacrylates or dimethacrylates. The above-exemplified compounds may be used as a mixture of two or more.

Examples of suitable monomers (C) used in this invention are N,N-dimethylmethacrylamide ($-0.88$), 2-hydroxyethyl methacrylate ($-0.41$), and glycidyl methacrylate ($-0.48$). N,N-dimethylacrylamide, 2-hydroxyethyl acrylate and glycidyl acrylate can also be used. These compounds may be used as a mixture of two or more.

The monomeric mixture can be polymerized by conventional methods such as suspension, emulsion, solution, and bulk polymerization techniques. The suspension-polymerization technique is preferred in this invention because the resulting polymer particles can be directly used as the chromatographic filler. Conventional solvents such as water, ethanol and benzene can be used in the polymerization. If the suspension polymerization is carried out in the presence of a small amount of an organic solvent capable of dissolving the monomers but incapable of dissolving the polymer, such as toluene, the resulting copolymer particles are porous and therefore, a filler can be obtained which has an increased area of contact with the moving phase.

The filler composed of a hydrophilic ion exchanger in accordance with this invention is filled in a column in a customary manner and used as the stationary phase in liquid chromatographic analyses. It shows an analyzing behavior based on its ion-exchanging mechanism in liquid chromatography. When the copolymer is obtained as particles, those having a desired particle size are selected for use as the filler. When the copolymer is obtained as a bulk, it is pulverized to the desired particle size. Or a coated filler obtained by coating the surface of a suitable core material such as glass spheres with the resulting copolymer may be used as the stationary phase. It is necessary that at least that part of the stationary phase which makes contact with the moving phase should be constructed of the ion exchanger defined in this invention.

Since the filler of this invention is composed of a copolymer derived from a monomeric mixture of the above-specified composition, it has the excellent ability to analyze and separate a biological material, such as proteins, enzymes and amino acids, which has been difficult to analyze heretofore, by liquid chromatography with a high accuracy within short periods of time, and its mechanical strength is excellent. Hence, it is suitable for use as a filler in high-performance liquid chromatography.

The separation of a biological material in accordance with this invention can be performed by connecting a column filled with the aforesaid hydrophilic ion exchanger to a liquid chromatographic device, preferably a high-performance liquid chromatographic device, and charging the biological material onto the column and passing an elvent, etc. in accordance with a usual technique of separation and determination by liquid chromatography. The optimum eluting conditions should be determined depending upon the type of the biological material to be separated and the type of the filler. Generally, it is preferred to use an aqueous solution having a pH of 5.0 to 10.0 and an ionic strength of at least 0.01 as an eluent. Various biological materials can be separated and assayed by techniques involving varying the pH or ionic strength during the separating operation.

When hemoglobin variants are to be separated, the sequence of their elution generally remains unchanged, and they separate in the order of $HbA_1a$, $HbA_1b$, $HbF$, $HbA_1c$, $HbA_o$ and $HbA_2$. By varying the eluting conditions, it is possible to separate a certain hemoglobin variant as a sharp chromatographic peak and the other hemoglobin variants and normal hemoglobin as aggregate peaks. This enables the desired hemoglobin variant to be assayed effectively within a short period of time. Preferably, the detection of hemoglobin variants is carried out by using visible light having a wavelength of 415 nm.

FIGS. 1 through 5 show chromatograms obtained in various examples.

The method of this invention makes it possible to separate the assay biological materials, particularly hemoglobin variants, within short periods of time with a high level of accuracy.

The following examples illustrate the present invention more specifically.

EXAMPLE 1

A 2-liter separable flask equipped with a condenser, a stirrer, a thermometer and a dropping funnel was charged with a mixture consisting of 400 ml of a 4% by weight aqueous solution of polyvinyl alcohol, 40 g of tetraethylene glycol dimethacrylate, 10 g of tetramethylolmethane triacrylate, 50 g of methacrylic acid, 40 g of toluene and 1.5 g of benzoyl peroxide. With stirring at 400 rpm, the mixture was heated to 80° C., and reacted at this temperature for 10 hours. After cooling, the polymerization product was washed with hot water and acetone to give spherical polymer particles having a diameter of 5 to 20 microns. Particles having 8 to 12 microns were selected, and dispersed in 800 ml of deionized water. The dispersed particles were filled in a stainless steel column, 7.9 mm in diameter and 3.0 cm in length, by sending deionized water at a rate of 1.6 ml/min. The filled column was connected to a high-performance liquid chromatographic device (Shimadzu-Du Pont High-Performance Liquid Chromatograph Model 830, a trademark), and used in the following analysis.

Standard serum (10 μl) was injected into the column by means of a microsyringe. As an event, a liquid A consisting of a mixture (pH 6.4) of 30% of 0.1N disodium phosphate and 70% of 0.1N monopotassium phosphate and a liquid B obtained by adding 3% of NaCl to the liquid A were used. Elution of the column was started by using 100% liquid A and just after injection of the sample, the composition of the eluent was changed by adding liquid B to liquid A at a rate of 10% per 5 minutes. The resulting chromatogram is shown in FIG. 1. In this chromatographic analysis, ultraviolet light having a wavelength of 280 nm was used as a detector.

FIG. 1 shows a peak 1 ascribable to an immunoglobulin G aggregate, a peak 2 ascribable to immunoglobulin A, a peak 3 ascribable to an immunogloblin G, a peak 4 ascribable to albumin, and a peak 5 ascribable to transferrin.

EXAMPLE 2

The same procedure as in Example 1 was followed except that in the production of the copolymer, 36 g of tetraethylene glycol dimethacrylate, 10 g of tetramethylolmethane triacrylate and 5 g of methacrylic acid were used as the monomers and 40 g of isoamyl alcohol, as the organic solvent. A similar chromatogram to FIG. 1 was obtained.

EXAMPLE 3

The procedure of Example 1 was followed except that 50 g of trimethylolethane trimethacrylate and 15 g of crotonic acid were used as the monomers and 40 g of toluene, as the organic solvent. A similar chromatogram to FIG. 1 was obtained although the elution time was 2 times as slow as that in Example 1.

EXAMPLE 4

A filler and a filled column were prepared in the same way as in Example 1 except that 40 g of nonaethylene glycol dimethacrylate and 10 g of acrylic acid were used as the monomers and 50 g of isoamyl clcohol, as the organic solvent. A mixture of lysine, histidine and arginine was analyzed by liquid chromatography on the filled column. The eluate was reacted with ninhydrin at 80° C. for 30 seconds and analyzed for absorbance at 590 nm. A 0.35N aqueous solution of sodium citrate having a pH of 5.3 was used as the moving phase. The chromatogram obtained is given in FIG. 2 which shows a peak 6 ascribable to lysine, a peak 7 ascribable to histidine and a peak 8 ascribable to arginine.

EXAMPLE 5

A 500 ml separable flash was charged with 40 g of tetraethylene glycol dimethacrylate, 50 g of methacrylic acid and 1.5 g of benzoyl peroxide. With stirring, they were polymerized in bulk at 80° C. for 5 hours. After cooling, the polymer was pulverized and sieved to remove fine and coarse particles and to obtain polymer particles having a size of about 50 microns. The selected polymer particles were dispersed in water to form a slurry, and the slurry was filled into a stainless column, 7.9 mm in diameter and 30 cm in length, by sending water at a rate of 1.6 ml/min. The filled column was connected to a high-performance liquid chromatographic device (Shimadzu-Du Pont High-Performance Liquid Chromatograph Model 830). By using this device, the same amino acid mixture as used in Example 4 was analyzed. Similar good results to those in Example 4 were obtained.

COMPARATIVE EXAMPLE 1

The procedure of Example 1 was followed except that in the production of the copolymer, 50 g of neopentyl glycol dimethacrylate (hydrophobic parameter 2.40) and 45 g of acrylic acid were used as the monomers and n-pentanol, as the organic solvent. The desired components of the serum sample were adsorbed firmly to the filler and could no be eluted from the column.

COMPARATIVE EXAMPLE 2

The procedure of Example 1 was followed except that in the production of the copolymer, 10 g of divinylbenzene (hydrophobic parameter 3.8) and 40 g of methacrylic acid were used as the monomers, and 40 g of toluene, as the organic solvent. The desired components of the serum sample could not be eluted from the column.

EXAMPLE 6

The same filler and column as used in Example 1 were used, and the filled column was connected to the same high-performance liquid chromatographic device as used in Example 1. Using this device, the following analysis was conducted.

As a sample, 10 μl of a hemoglobin solution was prepared by hemolyzing 50 μl of blood from a normal healthy person or a diabetic patient by mixing it with 1 cc of deionized water.

The solution was injected into the filled column by a microsyringe. As eluents, there were used a liquid A (pH 6.5) which was a mixture of 30% of 0.1N disodium phosphate and 70% of 0.1N monopotassium phosphate and a liquid B obtained by dissolving NaCl in the liquid A to a concentration of 3%.

Figure 3:
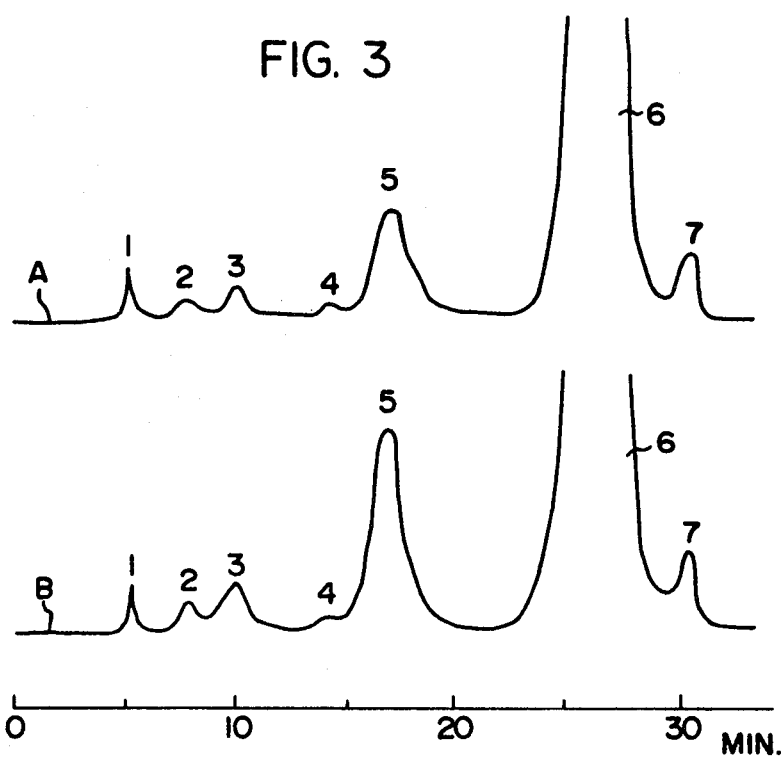
Figure 4:
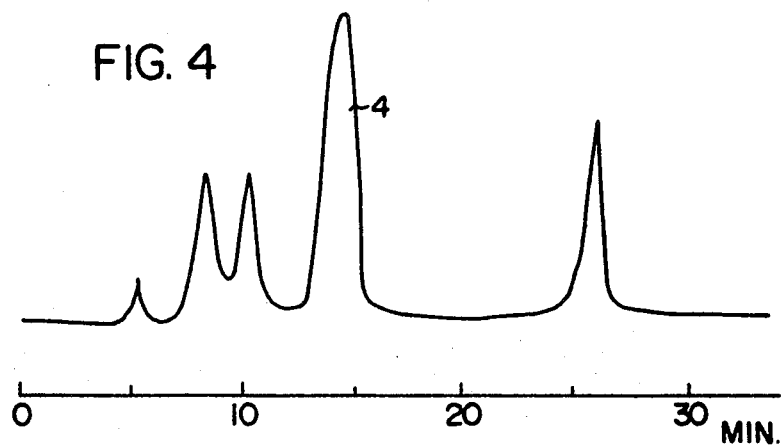

Elution of the column was started by using 100% liquid A, and just after injection of the sample, the composition of the eluent was changed by adding liquid B to liquid A at a rate of 5% per minute. The resulting chromatogram is shown in FIG. 3. The detection was performed by using visible light having a wavelength of 415 nm. In FIG. 3, the curves A and B refer respectively to the chromatograms of the blood of the normal healthy person and that of the diabetic patient.

Then, $A_{1a}$ $A_{1b}$, $A_{1c}$ and $A_0$ components were fractionated over the course of more than about 2 hours by ion-exchange column chromatography using a liquid chromatographic filler (Biorex-70, a product of Bio-Rad Laboratories, U.S.A.) well known in the art. Each of the fractions was analyzed by high-performance liquid chromatography under the same conditions as described above. It was determined that $A_{1a}$, $A_{1b}$, $A_{1c}$, $A_0$ and $A_2$ correspond respectively to the peaks 2, 3, 5, 6 and 7 in the chromatogram of FIG. 3. The peak 4 was found to be ascribable to HbF as a result of determination using a blood sample obtained from a fetus.

The amount of HbA$_1$c determined by the baseline method was 3.2% for the blood of the normal healthy person, and 5.9% for the blood of the diabetic patient.

EXAMPLE 7

By using the same column, device and eluting conditions as in Example 6, an aqueous solution obtained by mixing blood of a neonate with 20 times its volume of deionized water to hemolyze it was analyzed. The chromatogram shown in FIG. 4 was obtained. The peak 4 in the chromatogram was ascribable to HbF, showing very sharp separation.

EXAMPLE 8

Figure 5:
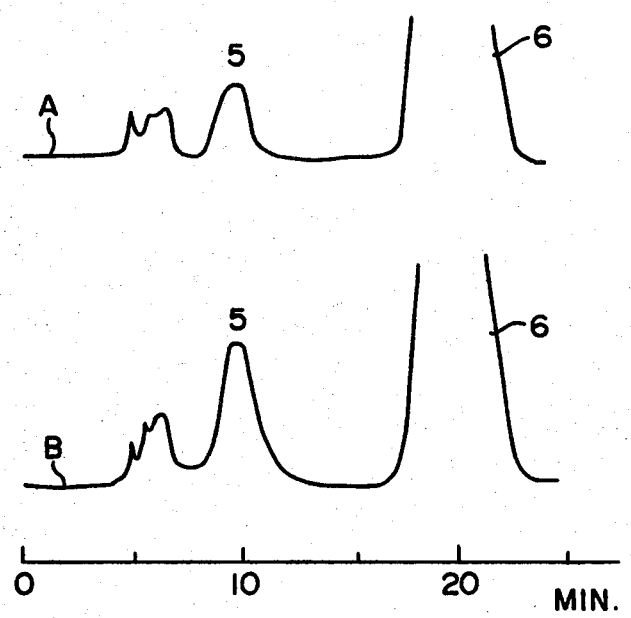

The same filler and column as used in Example 3 were used, and the filled column was connected to the same high-performance liquid chromatographic device as in Example 6. The same sample as in Example 6 was analyzed. Elution was performed by passing a mixture of 10% of the liquid A in Example 6 and 90% of the liquid B in Example 6 for 5 minutes, and then replaced by the liquid B. The resulting chromatogram is shown in FIG. 5. Curve A is the chromatogram of blood of a normal healthy person, and curve B, the chromatogram of the blood of a diabetic patient. The peak 5 was ascribable to HbA$_1$c, and the peak 6, to HbA$_0$. It is seen that HbA$_1$c could be separated within short periods of time.

EXAMPLE 9

A filled column was produced in the same way as in Example 1 except that in the preparation of the copolymer, a mixture consisting of 20 g of acrylic acid, 50 g of tetramethylolmethane tetraacrylate, 10 g of 2-hydroxyethyl methacrylate and 1.5 g of benzoyl peroxide was used. The same amino acid mixture as used in Example 4 was analyzed under the same conditions as in Example 4. Separation of three amino acids was confirmed, and the sequence of their elution was the same as in Example 4.

What we claim is:

1. A method for separating a hemoglobin variant in blood which comprises subjecting it to liquid chromatography using a filler, said filler consisting essentially of a hydrophilic ion-exchanger obtained by copolymerizing a mixture of (A) 5 to 90% by weight of a polymerizable monomer containing one polymerizable double bond and at least one carboxyl group per molecule and having a hydrophobic parameter of not more than 2.3, (B) 10 to 95% by weight of a crosslinkable polymerizable monomer containing at least two polymerizable double bonds per molecule and having a hydrophobic parameter of not more than 2.3, and (C) up to 85% by weight of a monomer being different from the monomer (A), containing one polymerizable double bond per molecule and having a hydrophobic parameter of not more than 2.3, wherein the monomer (A) is selected from the group consisting of acrylic acid, methacrylic acid, crotonic acid and maleic acid, the monomer (B) is selected from the group consisting of tetramethylolmethane tri- and tetraacrylates and -methacrylates, trimethylolethane triacrylates and trimethacrylates, dipentaerythritol hexaacrylate and hexamethacrylate and tetraethylene glycol dimethacrylate, and the monomer (C) is selected from the group consisting of N,N-dimethylacrylamide, N,N-dimethylmethacrylamide, 2-hydroxyethyl acrylate and, 2-hydroxyethyl glycidyl acrylate and glycidyl, glycidyl acrylate and glycidyl methacrylate.

2. The method of claim 1 wherein each of the monomers (A), (B) and (C) has a hydrophobic parameter of not more than 0.

3. The method of claim 1 wherein the copolymer contains all of the monomers (A), (B) and (C) in its structure.

* * * * *